US010364718B2

(12) United States Patent
Eddaoudi et al.

(10) Patent No.: US 10,364,718 B2
(45) Date of Patent: Jul. 30, 2019

(54) ON-BOARD $CO_2$ CAPTURE AND STORAGE WITH METAL ORGANIC FRAMEWORK

(71) Applicant: King Abdullah University of Science and Technology, Thuwal (SA)

(72) Inventors: Mohamed Eddaoudi, Thuwal (SA); Youssef Belmabkhout, Thuwal (SA); Osama Shekhah, Thuwal (SA)

(73) Assignee: KING ABDULLAH UNIVERSITY OF SCIENCE AND TECHNOLOGY, Thuwal (SA)

( * ) Notice: Subject to any disclaimer, the term of this patent is extended or adjusted under 35 U.S.C. 154(b) by 102 days.

(21) Appl. No.: 15/509,780

(22) PCT Filed: Sep. 11, 2015

(86) PCT No.: PCT/US2015/049683
§ 371 (c)(1),
(2) Date: Mar. 8, 2017

(87) PCT Pub. No.: WO2016/040799
PCT Pub. Date: Mar. 17, 2016

(65) Prior Publication Data
US 2017/0248051 A1 Aug. 31, 2017

Related U.S. Application Data

(60) Provisional application No. 62/049,331, filed on Sep. 11, 2014.

(51) Int. Cl.
*B01D 53/02* (2006.01)
*F01N 3/08* (2006.01)
*B01J 20/22* (2006.01)
*F01N 3/022* (2006.01)

(52) U.S. Cl.
CPC ........... *F01N 3/0821* (2013.01); *B01D 53/02* (2013.01); *B01J 20/226* (2013.01); *F01N 3/022* (2013.01);
(Continued)

(58) Field of Classification Search
CPC ........ B01D 2253/204; B01D 2253/306; B01D 2257/504; B01D 53/02; B01J 20/226;
(Continued)

(56) References Cited

U.S. PATENT DOCUMENTS

2007/0068389 A1   3/2007   Yaghi
2013/0298761 A1   11/2013  Hamad
(Continued)

FOREIGN PATENT DOCUMENTS

GB       2437063 A      10/2007
WO    WO2012/100165   *  7/2012    ............... C12N 1/12
WO    2013112792 A1      8/2013

OTHER PUBLICATIONS

Nugent, et al., "Supplementary Methods and Discussion," Supplementary Information, Apr. 18, 2018, 1-43.
(Continued)

*Primary Examiner* — Christopher P Jones
(74) *Attorney, Agent, or Firm* — Billion & Armitage; Benjamin C. Armitage

(57) ABSTRACT

In general, this disclosure describes method of capturing and storing $CO_2$ on a vehicle. The method includes contacting an vehicle exhaust gas with one or more of a first metal organic framework (MOF) composition sufficient to separate $CO_2$ from the exhaust gas, contacting the separated $CO_2$ with one or more of a second MOF composition sufficient to store the $CO_2$ and wherein the one or more first MOF composition comprises one or more SIFSIX-n-M MOF and wherein M is a metal and n is 2 or 3. Embodiments also describe an apparatus or system for capturing and storing $CO_2$ onboard a vehicle.

16 Claims, 2 Drawing Sheets

(52) U.S. Cl.
CPC ...... *F01N 3/0857* (2013.01); *B01D 2253/204* (2013.01); *B01D 2253/306* (2013.01); *B01D 2257/504* (2013.01); *F01N 2310/00* (2013.01); *F01N 2330/12* (2013.01); *Y02C 10/08* (2013.01)

(58) Field of Classification Search
CPC .. F01N 2310/00; F01N 2330/12; F01N 3/022; F01N 3/0821; F01N 3/0857; Y02C 10/08
See application file for complete search history.

(56) References Cited

U.S. PATENT DOCUMENTS

| | | |
|---|---|---|
| 2015/0093299 A1 | 4/2015 | Schnaars |
| 2015/0158013 A1 | 6/2015 | Eddaoudi et al. |
| 2015/0246340 A1* | 9/2015 | Zaworotko ............ B01J 20/226 95/127 |

OTHER PUBLICATIONS

"International Search Report and Written Opinion", International Application No. PCT/US2015/049683, dated Dec. 14, 2015, 9 pages.

Millward, et al., "Metal-Organic frameworks with exceptioinally high capacity for storage of carbon dioxide at room temperature", J. Am. Chem. Soc, 127(51), Dec. 1, 2005, 1-10.

Nugent, et al., "Porous materials with optimal adsorption thermodynamics and kinetics for CO2 separations", Nature, 495, Mar. 7, 2013, 80-84.

Shekhah, et al., "Made-to-order metal-organic frameworks for trace carbon dioxide removal and air capture", Nature Communications, Jun. 25, 2014, 1-7.

Wang, et al., "CO2 capture by solid adsorbents and their applications; current status and new trends", Energy Environ. Sci. 4, 2011, 44-55.

* cited by examiner

ON-BOARD $CO_2$ CAPTURE AND STORAGE WITH METAL ORGANIC FRAMEWORK

BACKGROUND

As the concentration of carbon dioxide ($CO_2$) in the atmosphere keeps increasing, serious concerns have been raised with respect to its impact on the environment. Since it started being monitored in 1958, the increase of $CO_2$ concentration in the atmosphere has accelerated from less than 1 ppm/year prior to 1970 to more than 2 ppm/year in recent years. As a result, the atmospheric level of $CO_2$ increased from 315 ppm in 1958 to 385 ppm in 2009. $CO_2$ is considered to be the main anthropogenic contributor to the greenhouse gas effect, as it is allegedly responsible for 60% of the increase in atmospheric temperature, commonly referred to as "global warming". Among the various sources of $CO_2$, approximately 30% is generated by fossil fuel power plants, and 25% from transportation sector, making them major contributors to global warming. Despite their impact on the environment, it is acknowledged that fossil fuels will remain the leading source of energy for years to come in the word, for both power generation and vehicle transportation.

Although $CO_2$ emission from the transportation sector represents only one third of the overall $CO_2$ emissions in the world, it denotes the highest source of emissions in urban populated areas. This situation is undoubtedly critical for the quality of air in populated regions and may cause severe health and societal problems. $CO_2$ capture and storage in vehicles is certainly a challenging problem, but due to its small scale, it is still technically more difficult than $CO_2$ capture in a stationary power plant.

With regards to $CO_2$ separation, liquid amine scrubbing is currently practiced on a large scale for the purification of industrial gases (e.g., natural gas, syngas) and also in life support systems in confined space (e.g., submarines, space shuttle). Amine scrubbing processes use alkanolamine aqueous solutions, the most common being mono- and di-ethanolamines, (MEA and DEA) and N-methyldiethanolamine (MDEA).

The use of aqueous solutions of low molecular weight alkanolamines suffers a number of drawbacks. Under scrubbing conditions, (i) a fraction of the amine and its decomposition products are lost by evaporation, which in addition to reducing the absorption capacity, may cause problems because of their toxicity, (ii) the amine undergoes oxidative degradation leading to decreased capacity, increased viscosity and excessive foaming, (iii) excessive corrosion takes place, thus posing severe operational problems. Moreover, for small scale applications, the current technology for wet acid gas removal remains economically challenged. Therefore, there is a persistent need to develop more efficient and economical processes and materials.

In addition to liquid phase systems, there were attempts to use solid or amine (impregnated and grafted), supported materials (mainly silica), particularly for air revitalization in manned space shuttles and $CO_2$ capture. The most common non-reactive acid gases adsorbent, i.e., zeolite 13X, is highly efficient for removing low level $CO_2$, but it requires high temperature activation (>350° C.), and its cyclic adsorption performance in the presence of moisture decreases dramatically, which requires a dehydration unit and acid gases removal prior to the $CO_2$ adsorption bed.

SUMMARY

In general, this disclosure describes method of capturing and storing $CO_2$ on a vehicle. The method includes contacting an vehicle exhaust gas with one or more of a first metal organic framework (MOF) composition sufficient to separate $CO_2$ from the exhaust gas, contacting the separated $CO_2$ with one or more of a second MOF composition sufficient to store the $CO_2$ and wherein the one or more first MOF composition comprises one or more SIFSIX-n-M MOF and wherein M is a metal and n is 2 or 3.

Embodiments also describe an apparatus or system for capturing and storing $CO_2$ onboard a vehicle.

BRIEF DESCRIPTION OF THE DRAWINGS

The accompanying drawings illustrate non-limiting example embodiments of the invention.

DETAILED DESCRIPTION

Figure 1:
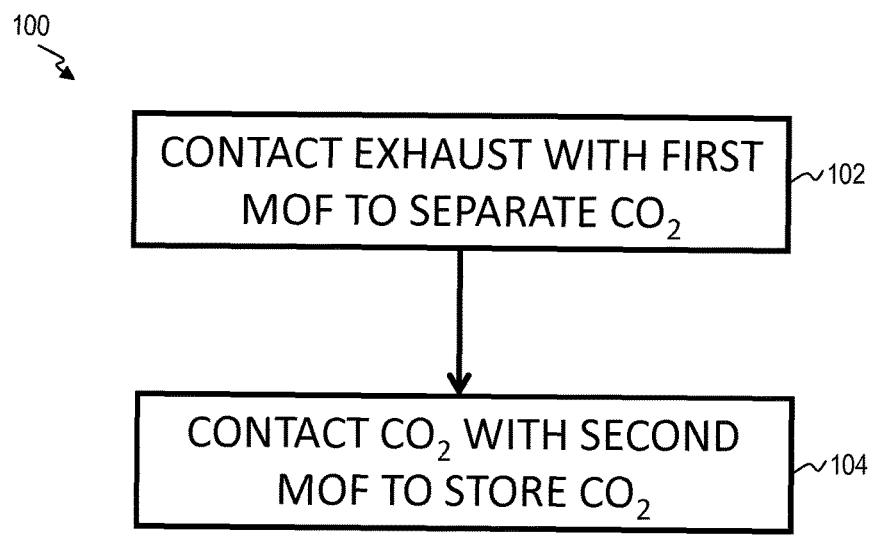
FIG. 1 illustrates a block flow diagram of a method of capturing and storing $CO_2$ on board a vehicle, according to some embodiments.

The present invention is described with reference to the attached figures, wherein like reference numerals are used throughout the figures to designate similar or equivalent elements. The figures are not drawn to scale and they are provided merely to illustrate the invention. Several aspects of the invention are described below with reference to example applications for illustration. It should be understood that numerous specific details, relationships, and methods are set forth to provide an understanding of the invention. One skilled in the relevant art, however, will readily recognize that the invention can be practiced without one or more of the specific details or with other methods. In other instances, well-known structures or operations are not shown in detail to avoid obscuring the invention. The present invention is not limited by the illustrated ordering of acts or events, as some acts may occur in different orders and/or concurrently with other acts or events. Furthermore, not all illustrated acts or events are required to implement a methodology in accordance with the present invention.

Embodiments of the present invention describe a system, apparatus and method for capturing and storing $CO_2$ from emissions or exhaust, on board a vehicle. Numerous MOF compositions and materials can be utilized, but it is important that MOF compositions with high selectivity are utilized for $CO_2$ capture and MOF compositions with high volumetric uptake characteristics are used for storage. The first (capture) and second (storage) MOF selections can include various portions of the same and differing MOFs and a plurality of MOFs, so long as such parameters are met. MOFs using the single ion approach, molecular building block (MBB), supermolecular building block (SBB), and platforms of soc-MOF, rht-MOF, ZMOFs, and SIFSIX MOFs can be used. The selected MOFs can be utilized to form a system for capturing $CO_2$ in exhaust gas in vehicles and on-board storage, driven by highly selective MOFs in the presence of $N_2$ and water vapor and highly $CO_2$ adsorbable MOFs in a storage component. Infrastructure can be created from incentives to municipalities, oil and automobile industries to development the system for collected such captured and stored $CO_2$ at gas stations.

Generally, MOFs comprise a network of nodes and ligands, wherein a node has a connectivity capability at three or more functional sites, and a ligand has a connectivity capability at two functional sites each of which connect to a node. Nodes are typically metal ions or metal containing clusters, and, in some instances, ligands with node connectivity capability at three or more functional sites can also be characterized as nodes. In some instances, ligands can include two functional sites capable of each connecting to a node, and optionally one or more additional functional sites which do not connect to nodes within a particular framework. In some embodiments, ligands can be poly-functional, or polytopic, and comprise two or more functional sites capable of each connecting to a node. In some embodiments, polytopic ligands can be heteropolytopic, wherein at least two of the two or more functional sites are different.

A MOF can comprise a metal-based node and an organic ligand which extrapolate to form a coordination network. Such coordination networks have advantageous crystalline and porous characteristics affecting structural integrity and interaction with foreign species (e.g., gases). The particular combination of nodes and ligands within a framework will dictate the framework topology and functionality. Through ligand modification or functionalization, the environment in the internal pores can be modified to suit specific applications.

A MOF can be represented by the formula [(node)a(ligand)b(solvent)c]n, wherein n represents the number of molecular building blocks. Solvent represents a guest molecule occupying pores within the MOF, for example as a result of MOF synthesis, and can be evacuated after synthesis to provide a MOF with unoccupied pores. Accordingly, the value of c can vary down to zero, without changing the definitional framework of the MOF. Therefore, in many instances, MOFs as provided herein can be defined as $[(node)_a(ligand)_b]_n$, without reference to a solvent or guest molecule component.

An example of a class of MOFs is SIFSIX-n-M, wherein n is at least two, and M can comprise Cu, Zn, Co, Mn, Mo, Cr, Fe, Ca, Ba, Cs, Pb, Pt, Pd, Ru, Rh, and Cd. The SIFSIX-n-M MOF class is isoreticular across its metal analogues (i.e., each M analogue has the same framework topology) and is characterized by periodically arrayed hexafluorosilicate (SIFSIX) octahedral pillars. SIFSIX-n-M MOFs have many desirable characteristics, including tunable pore sizes, which lend the various analogues well to a number of industrial applications.

Referring to FIG. 1, a block flow diagram 100 of a method of capturing and storing $CO_2$ on board a vehicle is shown, according to some embodiments. One or more of a first metal organic framework (MOF) composition is contacted 102 with an exhaust (i.e., emission) gas stream of a vehicle, sufficient to separate $CO_2$ from the exhaust gas. The separated $CO_2$ is contacted 104 with one or more of a second MOF composition, sufficient to store the $CO_2$. Contacting 102 and 104 can include mixing, bringing in close proximity, chemically contacting, physically contacting or combinations thereof. The major components (i.e., those comprising greater than about 1%) of exhaust or emission gas stream from a vehicle with an internal combustion engine (ICE) typically include $N_2$, $CO_2$, CO, $H_2O$, and $O_2$. Minor components (i.e., those comprising less than about 1%) of ICE exhaust or emission gas stream typically include SOx compounds (e.g., $SO_2$, $SO_3$), NOx compounds (e.g., NO, $NO_2$), low molecular weight aldehydes (e.g., HCHO), low molecular weight organic acids (e.g., HCOOH), low molecular weight alcohols (e.g., $CH_3OH$), and hydrocarbons (e.g., $C_nH_m$). For spark ignition (i.e., gasoline) ICEs, $H_2$ and CO typically comprise major components of exhaust. For compression ignition (i.e., diesel) ICEs, $H_2$ and CO typically comprise minor components of exhaust. In a vehicle utilizing oxy-combustion capture, the nitrogen is substantially removed from air to create an oxygen input stream. The exhaust from this type of vehicle typically contains significantly higher amounts of $CO_2$ and $H_2O$ by weight, and very small amounts of $N_2$. In an example, a typical car might produce about 70 kg of $CO_2$ in a 300 mile drive.

The first MOF can include one or more SIFSIX-n-M MOFs or other sister analogues. M is a metal and n can be 2 or 3. The metal can be zinc or copper, such as SIFSIX-3-Cu metal organic framework or SIFSIX-3-Zn metal organic framework. The metal can also be one or more of Cu, Zn, Co, Mn, Mo, Cr, Fe, Ca, Ba, Cs, Pb, Pt, Pd, Ru, Rh, or Cd. The SIFSIX-n-M composition can include bidentate N-donor ligands, for example. A combination or plurality of first MOFs can be utilized for capture. The high affinity capture MOF can allow the vehicle to drive 300 miles before discharging the captured and subsequently stored $CO_2$, for example. The weight of the first (and/or second) MOF in combination with the device/system weight is a factor in system and vehicle design. Lighter weight MOF compositions may be preferable in some embodiments. For example, using a SIFSIX MOF, about 70 kg of MOF may be used to separate about 0.11 kg of $CO_2$ per kg/MOF at about 0.15 bar in a 30 minute cycle. The temperature at capture can be about 298 to 343 K, if at 1 bar, for example. The $CO_2$ can then be pressured to 25-70 bar at about 298 to about 308K for storage.

Contacting 102 can include adsorption, for example. Contacting 102 can include adsorbing and separating, such as in an adsorption column. Contacting 102 and 104 can occur at ambient temperature, at an elevated temperature, at a cooled temperature, or over a temperature range. In one embodiment, a temperature can be selectively changed to manipulate sorption and/or desorption of different compounds, such as moving $CO_2$ from capture to storage in a system. In one embodiment, pressure can be selectively changed to manipulate sorption and/or desorption of $CO_2$. In addition to or in the alternative to, a concentration of one or more MOF compositions can be varied to affect a rate and/or magnitude of contacting 102 and 104. One or more of temperature, pressure and MOF concentration can be regulated to produce a simultaneous separation or storage of $CO_2$, or a subsequent, step-wise separation and then storage (i.e., in series) of $CO_2$ from exhaust. In series contacting 102, 104 generally includes separating a quantity of $CO_2$ via one or more first MOFs, and subsequently contacting 104 (i.e., sorbing) a quantity of $CO_2$ via the one or more second MOF. Simultaneous contacting 102, 104 generally includes contacting a first amount of $CO_2$ with the first MOF, and sorbing a quantity of the same or subsequent $CO_2$ with the second MOF. Contacting 102 (such as separation) can be accomplished at lower pressures than contacting 104 (such as storing), for example.

For example, initially the (i) $CO_2$ can captured at 1 atm (1 bar) and at a temperature in the 298-338K range. The $CO_2$ captured in each cycle in an adsorption column (filled with the separation agent, such as a SIFSIX MOF) is collected, (ii) pressurized and stored in a cylinder filled with a MOF storage agent (such as rht MOF). The pressure can range between about 25 and 70 atm. The temperature of storage can be about 298-308 K, in some embodiments.

SIFSIX-n-M MOFs can be coordinated by a variety of organic ligands. In some embodiments, the ligand can be any bidentate (i.e., bi-functional) N-donor linkers based on monocyclic or polycyclic group (aromatic or not). In some embodiments, a ligand can comprise a polydentate, or poly-functional ligand, such as a bi-functional ligand, a tri-functional ligand, or ligands with four or more functional sites. In some embodiments, a ligand can comprise an N-donor linker. In some embodiments a ligand can comprise a poly-functional ligand. In some embodiments, a ligand can comprise a plurality of N-donor functional groups. Pyrazine is an example of a ligand with two N-donor functional groups. In some embodiments, a ligand can comprise a monocyclic or polycyclic group structure, wherein the cyclic groups can be aromatic or nonaromatic. In some embodiments, a ligand can comprise a nitrogen-containing monocyclic or polycyclic group structure. In some embodiments, a ligand can comprise a nitrogen-containing heterocyclic ligand, including pyridine, 4,4'-Bipyridin, pyrazine, pyrimidine, pyridazine, triazine, thiazole, oxazole, pyrrole, imidazole, pyrazole, triazole, oxadiazole, thiadiazole, quinoline, benzoxazole, benzimidazole, 1,4-Diazabicyclo[2.2.2]octane (DABCO), 1,2-bis(4-pyridyl)acetylene (dpa), and tautomers thereof.

The SIFSIX-n-M MOFs presented herein provide uniformly distributed and non-reactive $CO_2$ adsorption energetics and remarkable $CO_2$ adsorption properties, uptake and selectivity in emission/exhaust gas streams. SIFSIX MOF provide unprecedented $CO_2$ uptake and selectivity over $H_2$, $CH_4$ and $N_2$ at very low partial pressures. SIFSIX-n-M MOFs are suitable for post-combustion capture (at $CO_2$ partial pressures of about 100 mbar).

The one or more second MOF compositions can comprise a SIFSIX-n-M MOF. The one or more second MOF composition can include a soc-MOF analogue, for example. The second MOF metal can include In, Fe, Ga, Al and combinations thereof, for example. Examples of the second MOF, suitable for $CO_2$ storage, include MOF-200, MOF-177, rht-MOF-9 and tbo-MOF-2. When choosing one of more second MOFs for storage, MOFs with a high porosity (including a high surface area and pore volume) result in high uptake properties. Also, there will be also a compromise between the gravimetric and volumetric $CO_2$ storage uptake. Due to this compromise, a high surface area may be around 6000 $m^2$/g, for example. In an example, a storage tank with MOF-200 can be pressurized at 40 bar to store about 2.4 kg of $CO_2$ per/kg of MOF. In another example, a storage tank with MOF-177 can be pressurized at 40 bar to store about 1.3 kg of $CO_2$ per kg of MOF. About 50 kg/300 miles of tbo-MOF-2 can be utilized for storage, for example. As described previous, a combination or plurality of second MOFs can be used for storage.

The first and second MOF compositions can be part of an apparatus/system/device for capturing and storing $CO_2$ on a vehicle. The device can include a filter component including one or more of a first MOF composition, in contact with an exhaust stream of a vehicle and capable of separating $CO_2$ from the exhaust stream, and a storage component including one or more of a second MOF composition, capable of storing the separated $CO_2$. The device can include an exhaust inlet and outlet, for example. The filter component can be integrated with or separate from the storage component. The filter component can be an adsorption column, for example. The storage component can be a storage tank, for example. The filter component can be adjacent to or within the storage tank.

EXAMPLE

Figure 2:
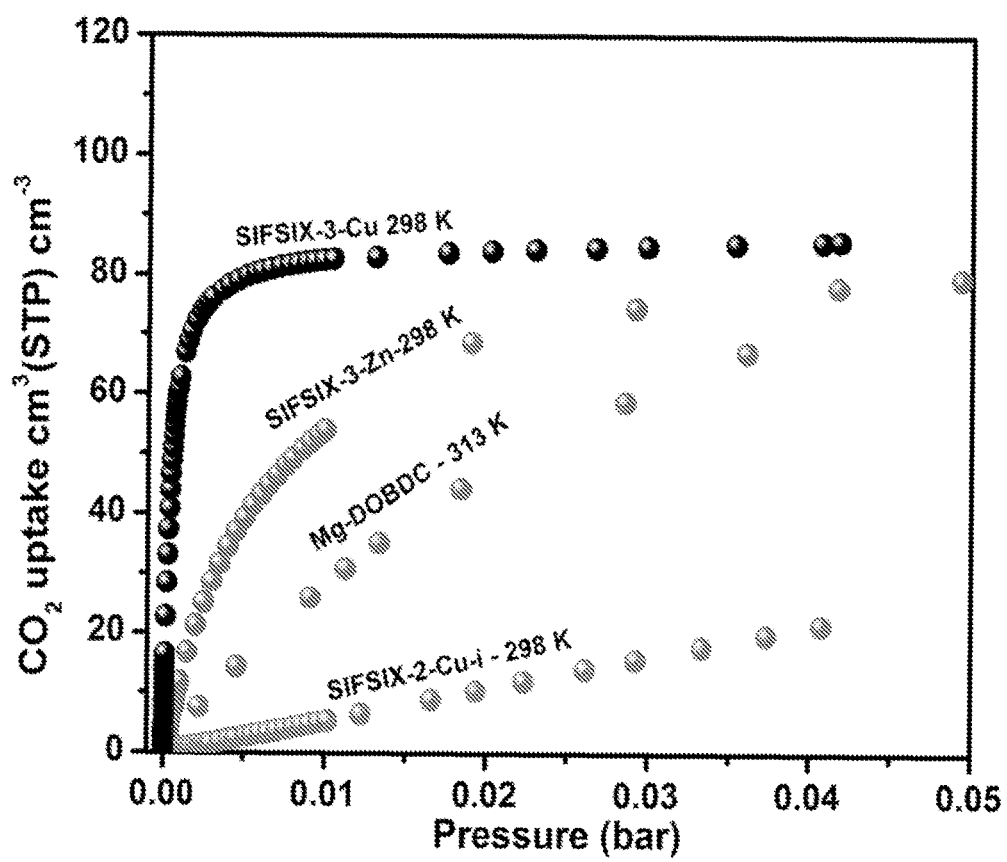
FIG. 2 illustrates a graphical view of $CO_2$ isotherms from the family of SIFSIX-MOFs, according to some embodiments.
Figure 3:
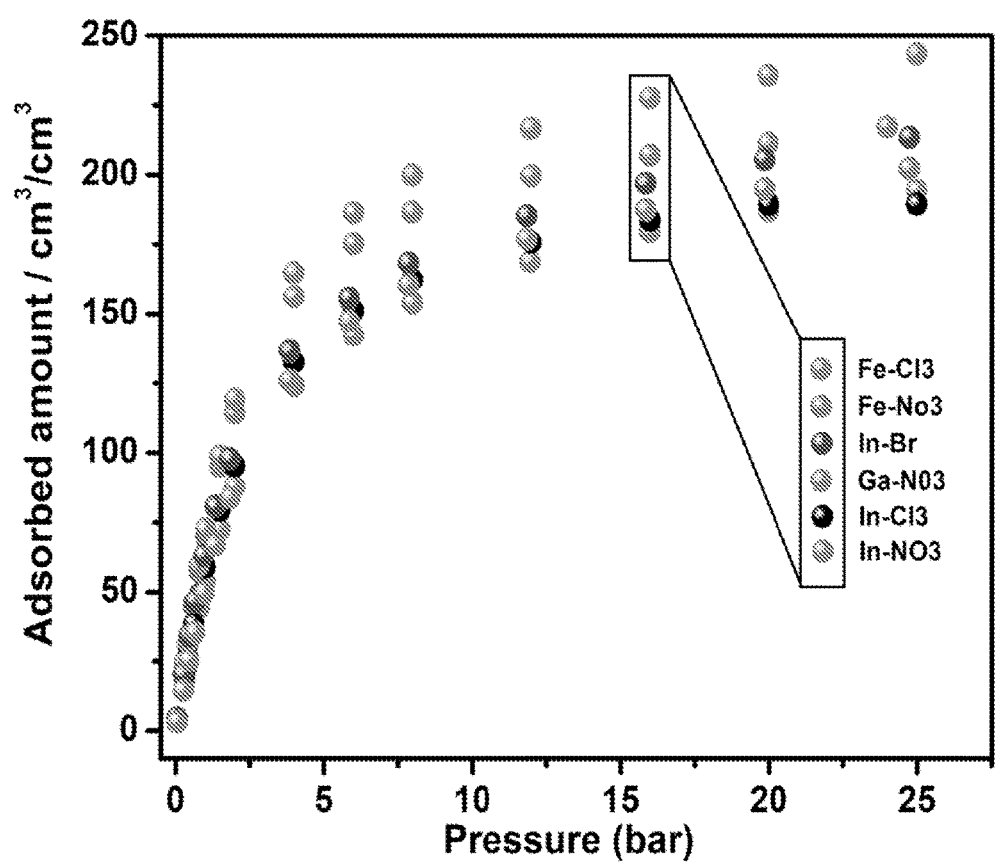
FIG. 3 illustrates a graphical view of $CO_2$ isotherms at high pressure from the family of soc-MOFs, according to some embodiments.

The on board $CO_2$ capture and storage system using MOF adsorbents is composed of two systems operating in parallel (i) $CO_2$ capture and (ii) $CO_2$ storage. Therefore the overall system requires efficient separation and storage agents. The $CO_2$ capture system utilizes MOF separation agents from the family of SIFSIX-M-3 and SIFSIX-M-2-i. This MOFs exhibit high selectivity and high volumetric capacity at 0.15 bar and 25-50° C. (FIG. 2). The $CO_2$ storage system utilizes MOFs with high volumetric uptake at high pressure. As an example, FIG. 3 shows the performances of various soc-MOF analogues for $CO_2$ storage.

What is claimed is:

1. A method of capturing and storing $CO_2$ on a vehicle, comprising:
    contacting an vehicle exhaust gas with a first metal organic framework (MOF) composition, sufficient to separate $CO_2$ from the exhaust gas;
    contacting the separated $CO_2$ with a second MOF composition, sufficient to store the $CO_2$; and
    wherein the first MOF composition comprises one or more SIFSIX-n-M MOFs and wherein M is a metal and n is 2 or 3.

2. The method of claim 1, wherein the second MOF composition comprises a soc-MOF analogue.

3. The method of claim 1, wherein the metal comprises zinc or copper.

4. The method of claim 1, wherein the metal comprises Cu, Zn, Co, Mn, Mo, Cr, Fe, Ca, Ba, Cs, Pb, Pt, Pd, Ru, Rh, or Cd.

5. The method of claim 1, wherein the first MOF composition comprises bidentate organic ligands.

6. The method of claim 1, wherein the first MOF composition comprises bidentate N-donor organic ligands.

7. The method of claim 1, wherein the first MOF composition comprises a SIFSIX-3-Cu metal organic framework.

8. The method of claim 1, wherein the first MOF composition comprises a SIFSIX-3-Zn metal organic framework.

9. An apparatus for capturing and storing $CO_2$ on a vehicle, comprising:
    a filter component including a first MOF composition, in contact with an exhaust stream of a vehicle, wherein the first MOF composition is configured to separate $CO_2$ from the exhaust stream; and
    a storage component including a second MOF composition, in fluid communication with the filter component, wherein the second MOF composition is configured to store the separated $CO_2$ ;
    wherein the first MOF composition is selected from SIFSIX-M-3, SIFSIX-M-2-i, and combinations thereof; wherein M is a metal.

10. The apparatus of claim 9, wherein the second MOF composition comprises a soc-MOF analogue.

11. The apparatus of claim 9, wherein the metal comprises zinc or copper.

12. The apparatus of claim 9, wherein the metal comprises Cu, Zn, Co, Mn, Mo, Cr, Fe, Ca, Ba, Cs, Pb, Pt, Pd, Ru, Rh, or Cd.

13. The apparatus of claim 9, wherein the first MOF composition comprises bidentate organic ligands.

14. The apparatus of claim 9, wherein the first MOF composition comprises bidentate N-donor organic ligands.

15. The apparatus of claim 9, wherein the first MOF composition comprises SIFSIX-Cu-3.

16. The apparatus of claim 9, wherein the first MOF composition comprises a SIFSIX-Zn-3.

* * * * *